United States Patent [19]

Sacks

[11] Patent Number: 4,938,540
[45] Date of Patent: Jul. 3, 1990

[54] RESIN-AUGMENTATION OF PIN-ASSEMBLY FOR EXTRUDED, ANODIZED WHEEL RIMS

[75] Inventor: Martin B. Sacks, Claypool, Ind.

[73] Assignee: Sun Metal Products, Inc., Warsaw, Ind.

[21] Appl. No.: 90,121

[22] Filed: Aug. 27, 1987

Related U.S. Application Data

[63] Continuation of Ser. No. 735,594, May 20, 1985, Pat. No. 4,702,528.

[51] Int. Cl.$^5$ .............................................. B60B 21/00
[52] U.S. Cl. ........................................ 301/99; 301/30
[58] Field of Search ................... 301/30, 31, 95–99; 403/266, 267, 268, 292, 298

[56] References Cited

U.S. PATENT DOCUMENTS

| 2,137,910 | 11/1938 | Hautala | 301/31 X |
| 3,756,635 | 9/1973 | Beers | 403/292 X |
| 4,128,356 | 12/1978 | Carlisle | 403/292 |

FOREIGN PATENT DOCUMENTS 2308719 9/1973 Fed. Rep. of Germany ........ 301/99

Primary Examiner—Russell D. Stormer
Attorney, Agent, or Firm—Barnes & Thornburg

[57] ABSTRACT

Improved pin-assembly connecting joint for interconnecting the ends of aluminum alloy wheel rim extrusions, characterized by pin members force fit into tubulations having a larger total cross sectional area than the pin members so as to form channels in a portion of the tubulation, and the channels are sealed with an adhesive to provide a barrier against liquid chemicals, as well as a joint of enhanced strength.

12 Claims, 1 Drawing Sheet

RESIN-AUGMENTATION OF PIN-ASSEMBLY FOR EXTRUDED, ANODIZED WHEEL RIMS

This application is in continuation of Ser. No. 735,594, now U.S. Pat. No. 4,702,528 filed 5/20/85.

FIELD OF THE INVENTION

This invention relates generally to the manufacture and assembly of lightweight wheel rims and relates more particularly to improved structures for interconnecting the ends of aluminum alloy wheel rim extrusions for bicycles and the like.

BACKGROUND OF THE INVENTION

Because of their weight economy, strength, and stylishness, aluminum alloy extrusions have grown in popularity for the wheel rims of racing, touring and special event bicycles; and one widely used prior art scheme for interconnecting the cut ends of a rim extrusion has employed a pair of solid steel pins which are force-fit into the confronting ends of spaced-apart tubulations extruded into the rim cross-section. It has also been common practice heretofore to provide the tubulations with a non-round shape, such as triangular or elliptic, in order to avoid or ameliorate the creation of unsightly bulges on the rim sidewalls where the pins are pressed into the tubulations. However, the round pins do not fit completely into such tubulations, leaving one or more narrow channels communicating past the pins and into the annular spaces of the tubulations. Anodizing solutions applied to the completed rim after assembly have been found to invade the tubulations through these channels during chemical processing and to leak out later in retrograde flow. Unsightly staining of the anodized finish has resulted; and this has proved especially objectionable with regard to intense-color anodizations such as black, gold, red or blue treatments.

BRIEF DESCRIPTION OF THE INVENTION

The present invention solves the problem of anodizing chemicals and the like invading the tubulations of an extruded rim through the connecting joint therein and, in a preferred embodiment, provides a double sealant barrier against such liquid chemicals, as well as a joint of enhanced strength. Specifically, the present invention contemplates the formation in situ of a cured resin augmentation of the pin assembly of extruded, anodized wheel rims and the like.

Accordingly, a general object of the present invention is to provide a new and improved connecting joint for lightweight wheel rims.

Another object of the invention is to provide a strength-enhancing, liquid-barrier joint for such wheel rims.

Other objects and features of the invention pertain to the particular structures and materials by which the foregoing objects are attained.

BRIEF DESCRIPTION OF THE DRAWING

The invention, both as to its construction and its mode of fabrication, will be better understood by reference to the following disclosure and drawing forming a part thereof, wherein.

DETAILED DESCRIPTION OF THE INVENTION

Figure 1:
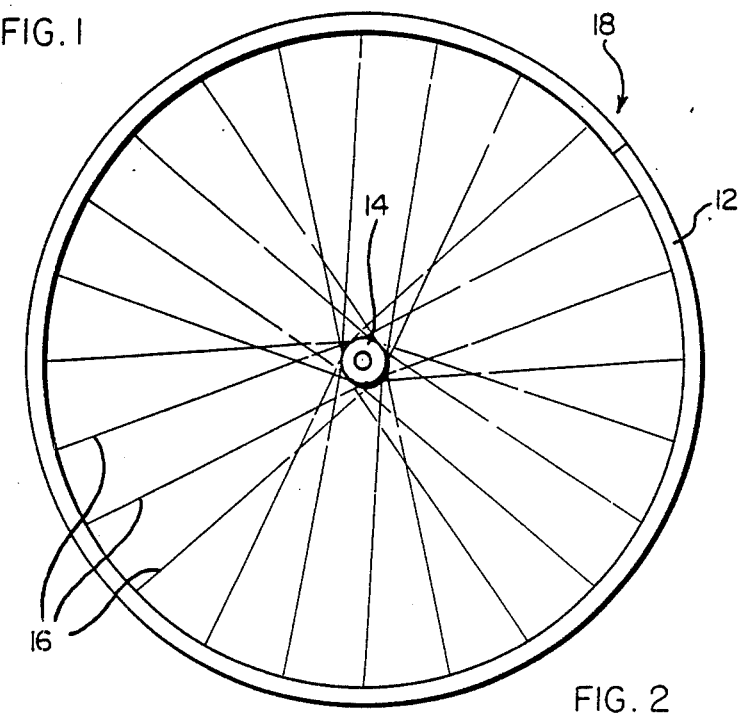
FIG. 1 is a side elevational view of a lightweight bicycle wheel assembly incorporating a rim joint construction fashioned in compliance with the present invention, the wheel assembly being shown with the tire demounted.

In accordance with conventional practice, and with reference to FIG. 1, a lightweight bicycle wheel assembly indicated generally by the reference numeral 10 comprises a circular rim 12, a journalled hub 14, and a suitable number of wire spokes 16 which are tightly laced or tensioned between the hub 14 and the rim 12. The rim 12 is adapted to receive a rubber tire body or casing and is specifically fabricated as an aluminum alloy extrusion, the opposite ends of which are connected by a joint 18.

Figure 2:
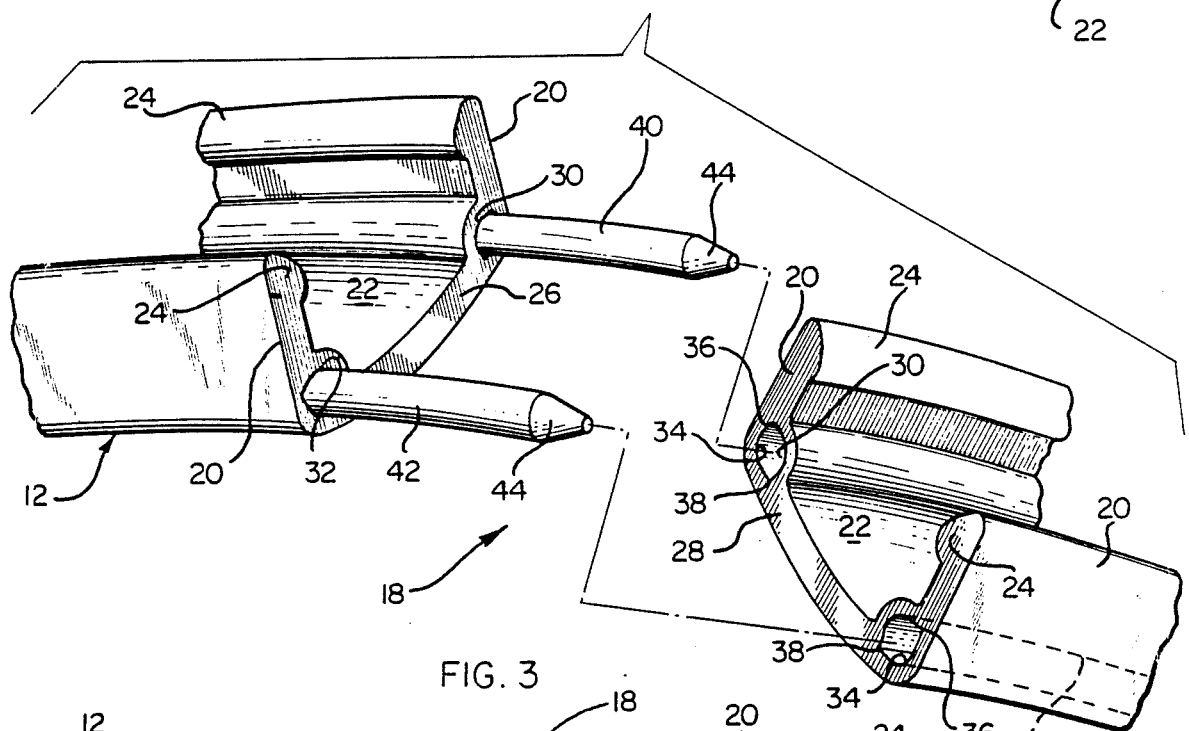
FIG. 2 is an enlarged, exploded perspective view showing the interconnecting joint construction used in the rim of the wheel assembly of FIG. 1.

Turning to FIG. 2, the rim 12 is fashioned with a channel-shaped section and includes a pair of spaced, annular sidewalls 20 which are connected by an integral, annular root wall or floor 22. In addition, each of the spaced sidewalls 20 terminates in a bulbous edge or bead 24 to assist in mounting the tire body to the rim.

The aluminum alloy extrusion which defines the rim 12 is cut and trimmed to define a pair of end faces 26 and 28 which are abutted or confronted in making the joint 18. Furthermore, the extrusion is fabricated with spaced, continuous tubulations 30 and 32 which extend generally in a direction away from the end faces 26 and 28 and which are positioned respectively at the intersections of the sidewalls 20 and the root wall 22. In the practice of the present invention, the tubulations are fashioned with matching, non-round cross-section including a generally circular mid-portion 34, which defines a pin-receiving bore, and with one or more apical portions open to the mid-portion and extending radially outwardly of the mid-portion to define a channel that is open longitudinally to the pin-receiving bore. In the illustrated embodiment, the cross-section of the tubulations 30 and 32 specifically includes diametric, apical portions 36 and 38.

In forming the interconnecting joint 18 in the rim 12, a pair of solid pins 40 and 42 are force-fit into the tubulations 30 and 32 respectively; and a pin-to-aperture interference, of from about 0.005 to about 0.007 inches has proved useful in this regard. To lead the pins 40 and 42 into the tubulations 30 and 32, conically tapered tips 44 are provided on the ends of the pins.

Figure 4:
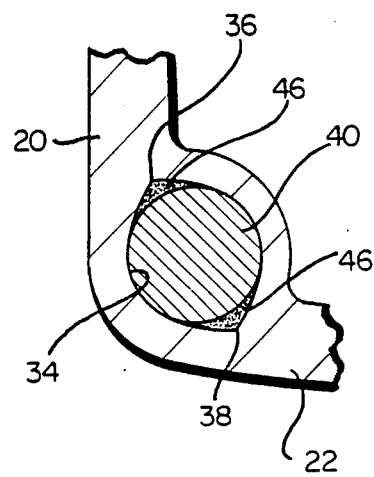
FIG. 4 is a still further enlarged view taken in cross-section substantially along the Line 4—4 of FIG. 3.
Figure 3:
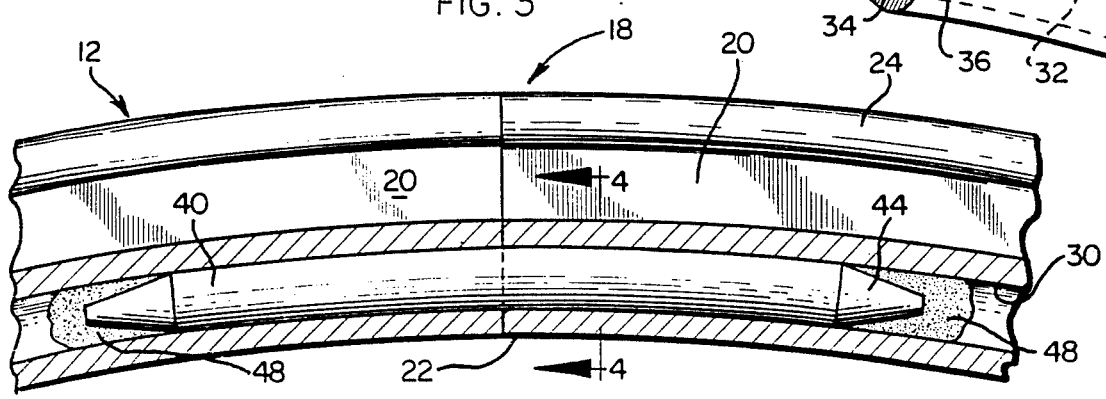
FIG. 3 is a further enlarged, side elevational view of the joint construction of FIG. 2 in its completed form.

In compliance with the features of the present invention and with reference to FIGS. 3 and 4, a quantity 46 of polymeric resin is cured in both of the apical channels 36 and 38, adhesively attached to the walls of the channel and to the confronting side surface of the pin 40, as is best seen in FIG. 4. Furthermore, quantities 48 of polymeric resin are cured in the tubulations 30 and 32 at the respective ends of the pins 40 and 42, adhesively attached to the walls of the tubulation and to the respective ends of the pin, effectively plugging the tubulations. Advantageously, the quantities 46 and 48 of polymeric resin are confluent to form an integral mass; and in compliance with the present invention, the polymeric resin is specifically selected to be an epoxy resin adhesive.

The epoxy resin adhesive which is employed in the present invention is characterized by good adherence to all metals and to hard plastics, as represented by a bond strength of at least about 1500 p.s.i.; by a usable pot life in excess of one-half hour at room temperature; and especially by being thixotropic in the as-mixed, uncured state, with a creamy or buttery consistency that promotes positive placement in the open ends of the rim tubulations 30 and 32. For this purpose, a two-part, room temperature curing, epoxy formulation is usefully employed; and one eminently suitable product in this regard is the two-part epoxy system comprising bisphenol A and epichlorohydrin and an amine-type curing agent which is sold by Armstrong Products Company of Warsaw, Indiana, under the trade designation "Armstrong A-31".

In accord with the method aspects of the present invention, a predetermined amount of the selected polymeric resin material is first inserted, in its uncured state, into the open ends of the tubulations 30 and 32, closely adjacent the corresponding end faces 26 and 28. Next, the pins 40 and 42 are forced into tubulations, extruding the resin material into the channels 36 and 38 and forming a plug of the resin material in the tubulations at the pin tips 44, as is shown in FIG. 3. Thereafter, the resin material is cured either at room temperature or by the application of mild heat, at 165° F. for example, the resin forming a strong adhesive bond with each of the metal surfaces that it contacts, hermetically sealing the joint 18. It is to be appreciated that the thixotropic nature of the uncured resin material preserves its selected, initial placement in the ends of the tubulations and promotes its subsequent extrusion into the channels 36 and 38 and into a plug-like mass at the tips of the pins 40 and 42.

After the resin has cured, the rim is ready for assembly with the hub 14 and the spokes 16; and it has been found that the joint 18 of the present invention, not only is strong enough to withstand radially outward spoke-lacing forces, but effectively resist invasion by liquid chemicals in subsequent anodizing processes.

The drawing and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated in the following claims.

The invention is claimed as follows:

1. A wheel rim formed with a pin type connecting joint comprising:
   a first and second end face of said rim having substantially abutting surfaces;
   said first and second end faces each having tubulations extending away from the end faces;
   pin means connecting the first and second end faces;
   said pin means consisting of at least one pin member insertable within said tubulations;
   said tubulations having a larger total cross sectional area than said pin so as to form channels along a portion of tubulation;
   sealing means surrounding a portion of said pin means to prevent migration of fluids into said tubulation;
   said sealing means forming a hermetic seal at the connecting joint formed between the first and second end faces restricting the migration of fluids into said joint.

2. The rim according to claim 1, wherein said sealing means comprises adhesive for bonding said pins to said rims at said tubulations resulting in said joint having enhanced strength.

3. The rim according to claim 2, wherein said adhesive includes a polymeric epoxy resin adhesive.

4. The rim according to claim 3, wherein said adhesive is inserted into said tubulations in an uncured state with a thixotropic consistency and allowed to cure in place.

5. The rim according to claim 1, wherein said sealing means forms an integral mass with the rim so that a liquid barrier joint is formed between said tubulations and the exterior environment.

6. The rim according to claim 1, wherein said tubulations have non-circular cross sections and said pins are force fit into said tubulations.

7. A method of joining two end faces of a rim having pin means cooperating with at least one tubulation extending away from the faces of the rim, said tubulation having a cross sectional area larger than said pin means so that at least one channel is formed leading away from said end face adjacent to said pin means, comprising the steps of:
   first, inserting a predetermined amount of sealing adhesive into said tubulation on one end face of said rim;
   second, inserting at least one pin attached to the opposite face into said tubulation so that said adhesive is extruded through said channels to provide a liquid barrier; and
   third, forcing said pin means further into the open tubulation until the end faces are abutting and said adhesive is extruded through said channels into the abutting faces to provide a hermetic seal against fluids and other substances.

8. The method of claim 7, further including the initial step of attaching said pin to a first end face by inserting a predetermined amount of adhesive into said tubulation and inserting the pin into said tubulation so that the adhesive is extended through said channel to provide an integral barrier to fluids.

9. The method of claim 7, wherein the adhesive is a polymeric epoxy resin inserted in a thixotropic uncured state and allowed to cure in place.

10. The method of claim 7, further including the step of allowing the adhesive to cure prior to exerting stress on the rim.

11. A wheel rim formed with a pin type connecting joint comprising:
   a first and second end face of said rim having abutting surfaces;
   pin means for joining said surfaces;
   said pin means joining said rim end faces together by a press fit engagement;
   said pin means including at least one pin connected to said first end face;
   said second end face having a tubulation extending away from said end face;
   said tubulation having cross-sectional area larger than cross-sectional area of said at least one pin;
   said press fit including areas of said tubulation in contact with said at least one pin;

said press fit further including gaps along the length of said at least one pin forming channels;

said channels filled with adhesive to form an integral mass with said at least one pin providing a sealing means restricting fluid movement through said tubulation.

12. A method of joining two end faces of a rim having pin means cooperating with tubulation extending away from the faces of the rim, said tubulations having a cross sectional area larger than said pin means so that a channel is formed leading away from said end face adjacent to said pin means, comprising the steps of:

first, inserting a predetermined amount of sealing adhesive into tubulations on each end face of said rim;

second, inserting a pin means into said tubulations on each side of said rim simultaneously;

third, forcing said pin means into the tubulations on each side of said rim simultaneously until said adhesive is extended through said channel thereby forming a sealant barrier against fluids and other substances entering said pin means.

* * * * *